United States Patent
Wei et al.

(10) Patent No.: US 9,030,746 B2
(45) Date of Patent: May 12, 2015

(54) FABRICATION METHOD OF MICROLENS ARRAY AND MICROLENS ARRAY THEREOF

(71) Applicant: National Taiwan University, Taipei (TW)

(72) Inventors: Hsiang-Chun Wei, Taipei (TW); Guo-Dung Su, Taipei (TW)

(73) Assignee: National Taiwan University, Taipei (TW)

( * ) Notice: Subject to any disclaimer, the term of this patent is extended or adjusted under 35 U.S.C. 154(b) by 318 days.

(21) Appl. No.: 13/681,798

(22) Filed: Nov. 20, 2012

(65) Prior Publication Data

US 2013/0329300 A1 Dec. 12, 2013

(30) Foreign Application Priority Data

Jun. 8, 2012 (TW) .............................. 101120618 A

(51) Int. Cl.
    *G02B 27/12* (2006.01)
    *G02B 3/00* (2006.01)
(52) U.S. Cl.
    CPC .............. *G02B 27/12* (2013.01); *G02B 3/0012* (2013.01); *G02B 3/0056* (2013.01); *G02B 2207/115* (2013.01)

(58) Field of Classification Search
    CPC .......................... G02B 27/123; G02B 3/0012
    USPC ........................................................ 359/620
    See application file for complete search history.

(56) References Cited

U.S. PATENT DOCUMENTS

2002/0027300 A1* 3/2002 Hartmann et al. ............. 264/1.1

* cited by examiner

*Primary Examiner* — Joseph P Martinez
(74) *Attorney, Agent, or Firm* — Bacon & Thomas, PLLC

(57) ABSTRACT

The present invention discloses a fabrication method of a microlens array (MLA) and an MLA fabricated using the same. The fabrication method of an MLA comprises: providing a substrate with an interface hydrophilic modified polymer layer; using light, gas or liquid with the property of converting the polymer' hydrophilicity to create a hydrophilic zone on the interface hydrophilic modified polymer layer; coating the substrate with a liquid material to condense a plurality of liquid microlenses in the hydrophilic zone; and curing the plurality of liquid microlenses to form a plurality of microlenses. Therefore, the fabrication method of an MLA has advantages of fast speed, low cost, no etch transfer and low temperature.

18 Claims, 6 Drawing Sheets

FABRICATION METHOD OF MICROLENS ARRAY AND MICROLENS ARRAY THEREOF

BACKGROUND OF THE INVENTION

1. Field of the Invention

The present invention relates to a fabrication method of a microlens array (MLA) and an MLA fabricated using the same, and more particularly, to a fabrication method of an MLA exploiting the hydrophilicity and electric field effect and an MLA fabricated using the same.

2. Description of the Prior Art

The application of microlenses has been highly valued in recent years because the microlens can significantly improve the performance of optoelectronic devices (esp. the light-emitting device, photodetector, solar cell, optical fiber communication systems, micro-optical-electromechanical system, etc.). The prior art proposed to fabricate microlenses on the surface of the LED so that the luminescent efficiency of the LED could be increased 50%. The prior art proposed to fabricate microlenses on the surface of the photodetector so that the photocurrent of the photodetector could be increased 11%. Similarly, the microlens is applied to the solar panel of the satellite to increase the light utilization efficiency of the solar panel. Therefore, people in the art have been endeavored to develop a method with which microlenses operable with optoelectronic devices can be fabricated with lower cost and higher efficiency.

Currently, MLAs can be fabricated using many techniques, e.g. ink jet printing, photoresist thermal reflow, hot press molding, photomask lithography and laser etching methods. However, most of the aforementioned methods have the drawbacks of high facility cost, time consumption, alignment inaccuracy, or the requirement of a high-temperature process.

Another fabrication method of an MLA exploits the hydrophobic effect. This method allows an accurate and direct fabrication of a polymer microlens array without heating. Thus, using the hydrophobic effect to fabricate MLAs is a simpler way. However, it still requires either an etch-transfer process or a printing method to define hydrophobic boundaries.

Therefore, a need exists in the art for a rapid and low-cost fabrication method of an MLA and an MLA fabricated using the same.

SUMMARY OF THE INVENTION

In view of the aforementioned prior art problems, an object of the present invention is to provide a fabrication method of an MLA exploiting the hydrophilicity and electric field effect and an MLA fabricated using the same so as to solve the problems of the current techniques concerning complex processes and the requirement of a higher temperature.

According to an object of the present invention, there is provided a fabrication method of an MLA comprising: providing a substrate with an interface hydrophilic modified polymer layer; using light, gas or liquid with the property of converting the polymer's hydrophilicity to create a hydrophilic zone on the interface hydrophilic modified polymer layer; coating the substrate with a liquid material to condense a plurality of liquid microlenses in the hydrophilic zone; and curing the plurality of liquid microlenses to form a plurality of microlenses.

According to an object of the present invention, there is provided an MLA suitable for being disposed on a substrate and comprising an interface hydrophilic modified polymer layer and a plurality of microlenses. The interface hydrophilic modified polymer layer is disposed on the substrate and defines a hydrophilic zone on the substrate via light, gas or liquid with the property of converting the polymer's hydrophilicity. The plurality of microlenses are arranged in the hydrophilic zone.

According to an object of the present invention, there is provided another fabrication method of an MLA comprising: providing a substrate with an interface hydrophilic modified polymer layer; placing a mask over the interface hydrophilic modified polymer layer; modifying the interface hydrophilic modified polymer layer by using UV/ozone and thereby to create a hydrophilic zone on the interface hydrophilic modified polymer layer; removing the mask; immersing the substrate in a liquid material and removing it therefrom so as to condense a plurality of liquid microlenses; curing the plurality of liquid microlenses with UV light to form a plurality of microlenses.

The aforementioned aspects and other aspects of the present invention will be better understood by reference to the following exemplary embodiments and drawings.

DETAILED DESCRIPTION OF THE PREFERRED EMBODIMENTS

The present invention will be fully described by way of preferred embodiments and appended drawings to facilitate the understanding of the technical features, contents and advantages of the present invention. It will be understood that the appended drawings are merely schematic representations and may not be illustrated according to actual scale and precise arrangement of the implemented invention. Therefore, the present invention shall not be construed based on the scale and arrangement illustrated on the appended drawings, and the scope of protection shall not be limited thereto.

The Working Mechanism

The SU(8) photoresist MLA is fabricated on an ITO (indium-tin oxide) glass substrate with an SU(8) photoresist base layer. SU(8) is a well-known photoresist which has good mechanical strength and UV curable property. The surface can be modified to be more hydrophilic by using UV/ozone treatment. It generates O—H on the phenol group, C═O and O—C═O hydrophilic function on SU(8) photoresist surfaces. This contributes to the hydrophilic surface of an SU(8) polymer. The liquid contact angle on the modified surface depends on the processing time, UV power and ozone concentration. The polar molecules of the SU(8) photoresist material enable SU(8) photoresist structures to be easily deformed by an external applied electric field. The larger electric field results in a greater curvature of the microlens. The SU(8) photoresist base layer keeps the microlens as a spherical profile via an external electric field. The base layer serves as a dielectric middle layer between SU(8) microlens and an ITO conductive layer.

Figure 1A:
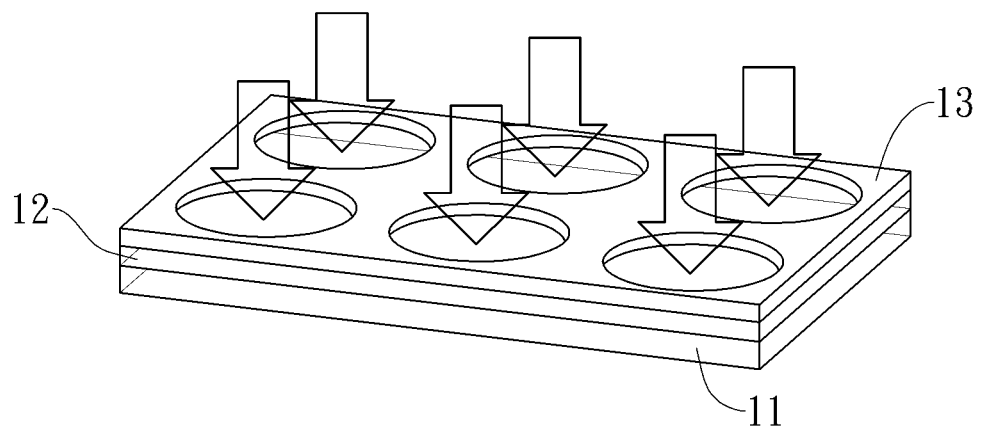
FIGS. 1A through 1D illustrate a fabrication process of an SU(8) MLA in accordance with an embodiment of the present invention.
Figure 1B:
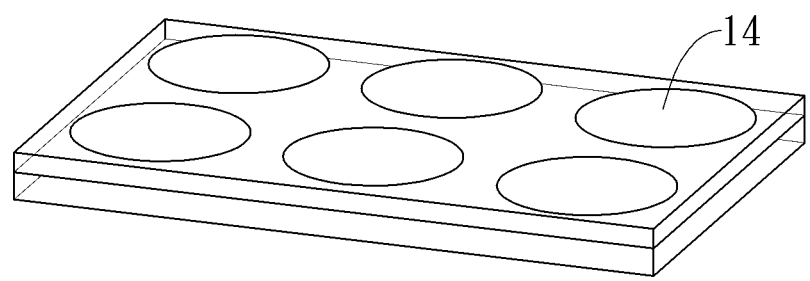
Figure 1C:
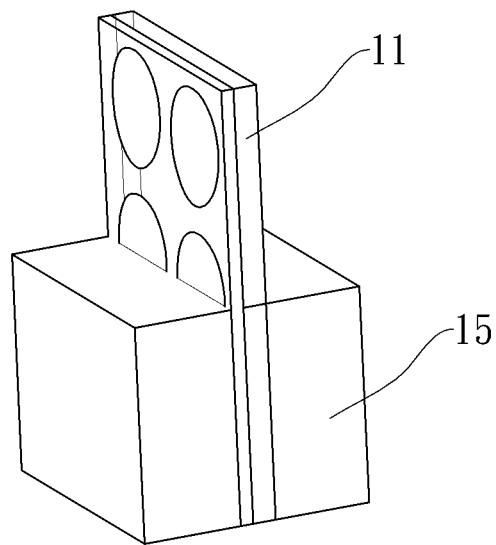
Figure 1D:
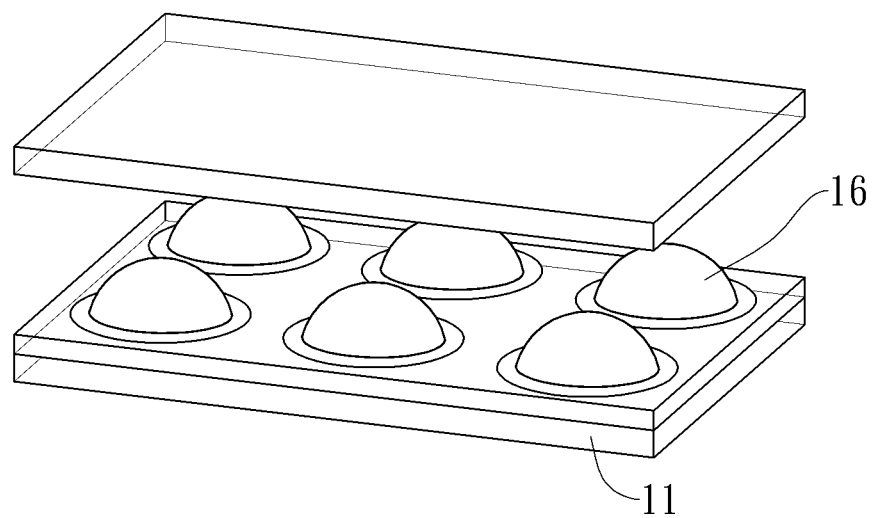

FIGS. 1A through 1D illustrate a fabrication process of an SU(8) MLA in accordance with an embodiment of the present invention. These drawings illustrate schematically the working principle of an SU(8) photoresist MLA by the use of the hydrophilic effect through UV/ozone treatment and the external electric field pulling. As shown in FIG. 1A, an ITO glass substrate 11, an SU(8) photoresist base layer 12 and a mask 13 are arranged in an order from the bottom to the top. A 10 μm thick mask 13 with circular openings is used to define the UV/ozone treatment areas on the SU(8) photoresist base layer 12. As shown in FIG. 1B, the exposed zones, i.e. the hydrophilic zones/hydrophilic surfaces 14, become more hydrophilic than the obstructed zones after UV/ozone treatment. Regarding the surface modification, a longer treatment time results in more hydrophilic surfaces 14. In other words, a smaller contact angle is formed under longer UV/ozone treatment time. After the more hydrophilic zones 14 are created and the mask 13 is removed, the substrate 11 is dipped in and out of a diluted SU(8) photoresist solvent (solution) 15 at a slow and constant velocity (approximately 0.3 mm/s), as shown in FIG. 1C. Finally, an MLA 16 is formed on the substrate 11 after an external electric field and a UV curing process have been applied, as shown in FIG. 1D.

The presented self-assembled technique utilizes the crosslink between the SU(8) microlens and an SU(8) photoresist base layer 12. It is very strong and not easy to be broken. The SU(8) photoresist solvent (solution) 15 must be diluted to an extent that it automatically stays on the zones 14 with more hydrophilic property. Because of the evaporation of the SU(8) photoresist solvent (solution) 15 after the UV curing process, the volume of the diluted SU(8) photoresist liquid microlens shrinks. Therefore, the contact angle is smaller compared with the default one and the footprint area of the liquid microlens is smaller than the opening of the mask 13. In general, the SU(8) photoresist base layer 12 with a higher surface energy results in a larger footprint area. In other words, longer UV/ozone treatment time and larger opening of the mask 13 result in higher surface energy. On the other hand, the external electric field reduces the surface energy of the SU(8) photoresist base layer 12. It increases the contact angles of SU(8) microlens and thereby to decrease the radius of curvature and keep the spherical profile. In these regards, the shape and the size can be controlled by adjusting the UV/ozone treatment time, the opening of the mask 13 and the externally applied voltage.

Fabrication Processes

In order to define the hydrophilic zones 14, a mask 13 is fabricated at first. The mask 13 has good mechanical strength and chemical resistance; therefore, it is removable and reusable. It is fabricated by micromachining processes. First, SU(8) photoresist solvent (solution) 15 is spun coated on the glass substrate 11 at the speed of 500 rpm for 5 s and 1000 rpm for 30 s. Next, it is soft baked at 95° C. for 3 min and then irradiated with light having a wavelength of 405 μm for 3.2 J/cm² exposure with optical masks having diameters of 50, 100 and 200 μm. The post-exposure baking is 65° C. for 2 min and 95° C. for 1 min. The hard backing is 150° C. for 3 min. Finally, the mask 13 with circular openings is released by isotropic etching in a buffered oxide etchant (i.e. the diluted hydrofluoric acid). The thickness of the mask 13 is approximately 10 μm.

In this embodiment, the ITO glass (LT-G001, Lumtek Corp., Taiwan) having a glass thickness of 1.1 mm and an ITO thickness of 1600 Å is cut into pieces with a dimension of 25 mm×25 mm. It is used as the substrate. The ITO resistance is 15 Ω/sq and the ITO has a visible transparency of greater than 84% in a wavelength of 550 nm. A commercially available SU(8) 3035 negative photoresist, an SU(8) 2000 thinner and an SU(8) developer (MicroChem Corp., Mass., USA) are used in the fabrication process. For cleaning the substrate, the ITO glass is first cleaned with acetone, isopropanol alcohol and deionized water, and then dehydrated on a hot plate at a temperature of 100° C. for 10 min.

The present invention will be described by way of another embodiment by reference to FIGS. 2A through 2G. These drawings illustrate schematically a fabrication process of an SU(8) MLA in accordance with another embodiment of the present invention.

SU(8) Photoresist Base Layer

Figure 2A:
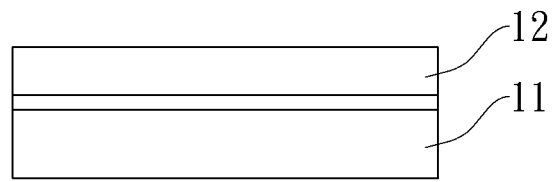
FIGS. 2A through 2G illustrate a fabrication process of an SU(8) MLA in accordance with another embodiment of the present invention.

In this embodiment, the ITO glass is chosen to serve as a substrate 11 because its hydrophilic surface produces a flatter coating of SU(8) photoresist and ITO serves as a conductive layer. In this embodiment, the spin coating method (NMC-W-1102, Laurell Technologies Corp., USA) is employed to coat SU(8) photoresist on the ITO glass. The spin speed is 500 rpm for 5 s and 4000 rpm for 30 s. In order to produce a thinner SU(8) photoresist layer, SU(8) 3035 negative photoresist and SU(8) 2000 thinner photoresist are mixed at a weight ratio of 10:8. The baking process is skipped in order to control the process at room temperature. It is finally exposed to and cured by 9.6 J/cm² of UV light. An SU(8) photoresist base layer 12 with 5 μm thickness is formed as shown in FIG. 2A.

UV/Ozone Treatment

Figure 2B:
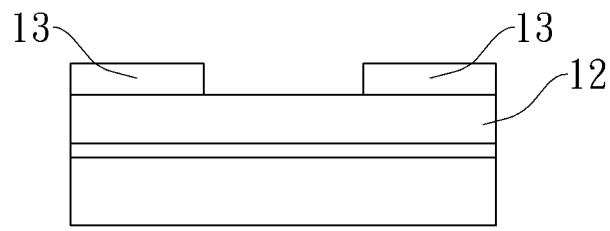
Figure 2C:
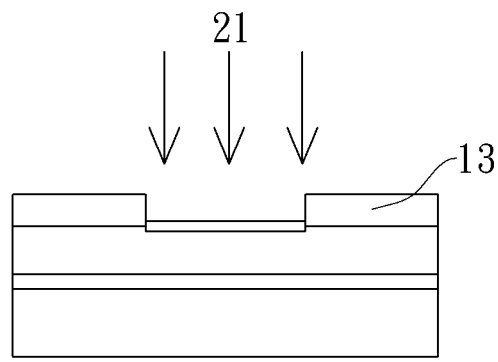
Figure 2D:
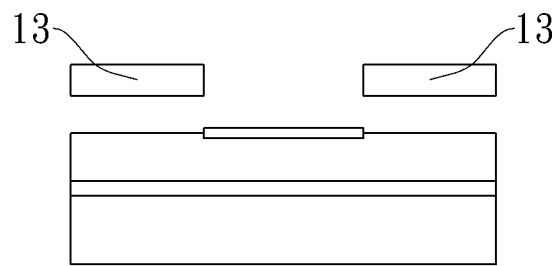
Figure 2E:
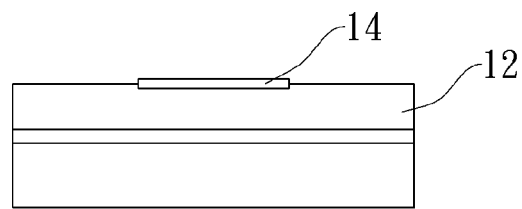

As described before, the surface of SU(8) photoresist is more hydrophilic via UV/ozone treatment. It depends on the processing time, UV power and ozone concentration. The light source of the UV/ozone cleaner (model UV-1, Samco) is 110 W at the wavelength between 254 and 182 nm. The oxygen flow rate is 0.5 L/min. In order to define the microlens footprint areas, the masks 13 with openings having diameters of 50, 100 and 200 μm are applied on the SU(8) photoresist base layer 12 as shown in FIG. 2B. Afterward, UV/ozone 21 treatment is performed on the masks 13 of different sizes for 1-4 min as shown in FIG. 2C. After the UV/ozone treatment, the mask 13 can be removed and stored for later usage as shown in FIG. 2D. Therefore, the SU(8) photoresist base layer 12 with circular zones 14, which are more hydrophilic, is formed as shown in FIG. 2E.

Dipping in and Out of Diluted SU(8) Photoresist

Figure 2F:
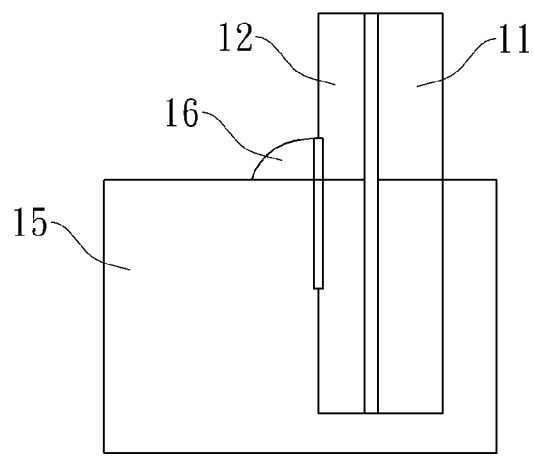

After the more hydrophilic zones 14 are created and the mask 13 is removed, the substrate 11 is dipped in and out of a diluted SU(8) photoresist solvent (solution) 15 at a slow and constant velocity (approximately 0.3 mm/s) as shown in FIG. 2F. SU(8) 3035 negative photoresist and SU(8) 2000 thinner are mixed at a volume ratio of 1:6 to form the diluted SU(8) photoresist solution 15. The mixture should be diluted such that its viscosity is low enough to ensure the separation of the SU(8) solvent (solution) 15 on different zones on the SU(8) photoresist base layer 12 due to surface energy difference. The MLA 16 is created after the substrate 11 is taken out of the diluted SU(8) photoresist solvent (solution) 15. At this time, the MLA is still liquid.

Applying Electric Field and UV Curing

Figure 2G:
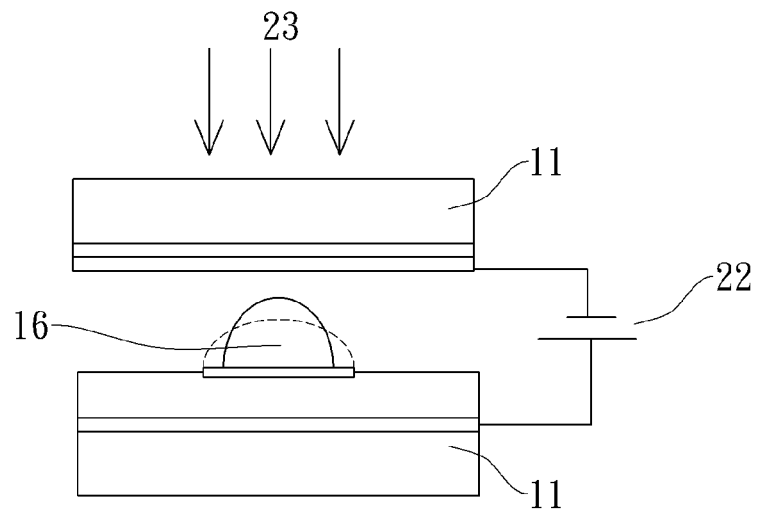

Finally, the ITO glass substrate 11 with the liquid MLA 16 is applied with an external electric field 22 to pull the liquid MLA 16 to a desirable curvature. The electric fields are 1.7 and 3.4 V/μm, respectively. The fabricated MLA 16 is then exposed to 7.2 J/cm2 of UV light radiation 23 having a wavelength of 405 μm to endow the cross-linked MLA 16 with high mechanical strength, as shown in FIG. 2G. An MLA fabricated in this way has a shorter focal length when compared with the MLA without an external electric field pulling.

Figure 3:
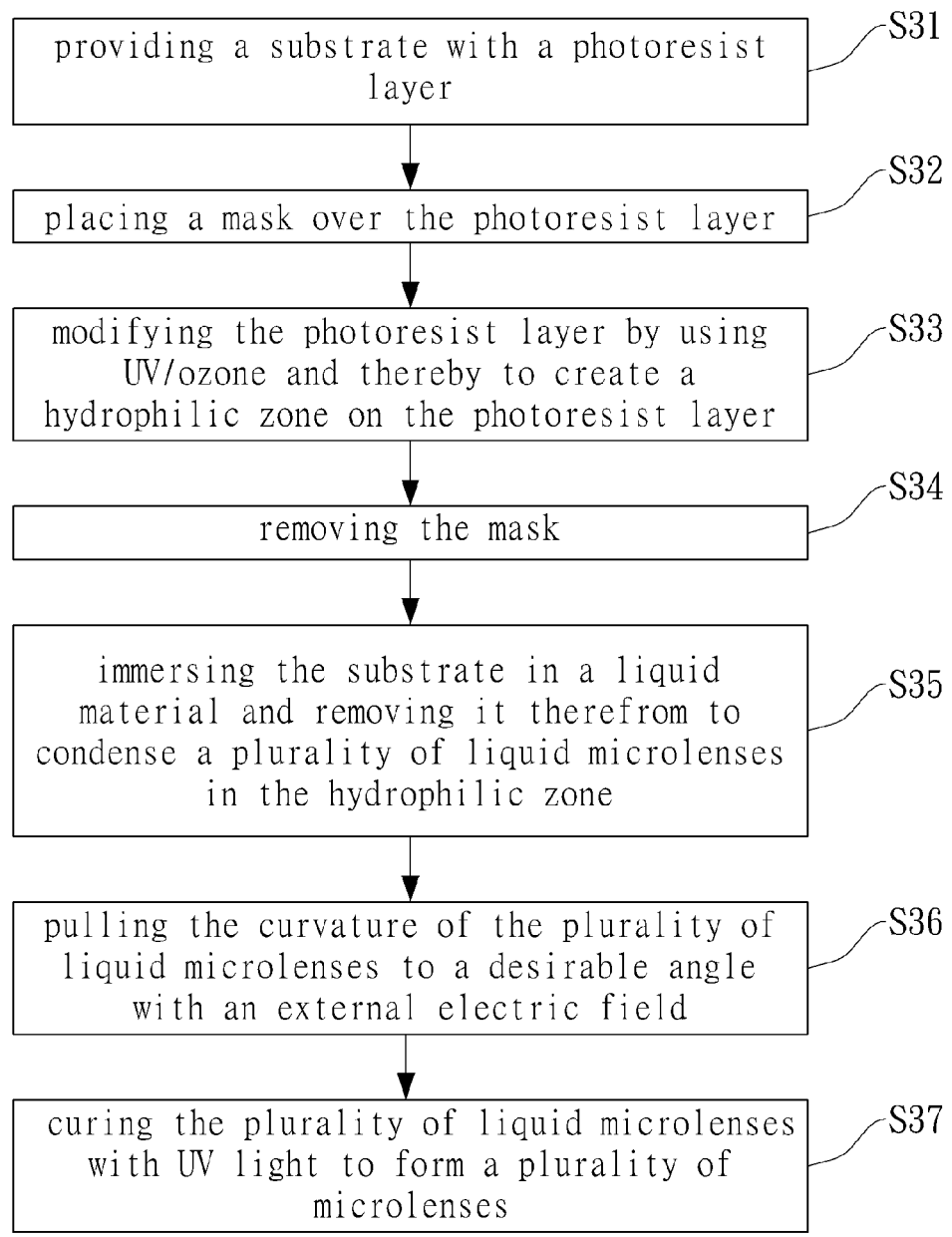
FIG. 3 is a flow chart illustrating a fabrication method of an MLA in accordance with an embodiment of the present invention.

The fabrication method of an MLA of the present invention will be described step by step so as to facilitate the understanding of the present invention. FIG. 3 is a flow chart illustrating a fabrication method of an MLA in accordance with an embodiment of the present invention. The fabrication method comprises the following steps:

(S31) providing a substrate with a photoresist layer;
(S32) placing a mask over the photoresist layer;
(S33) modifying the photoresist layer by using UV/ozone and thereby to create a hydrophilic zone on the photoresist layer;
(S34) removing the mask;
(S35) immersing the substrate in a liquid material and removing it therefrom to condense a plurality of liquid microlenses in the hydrophilic zone;
(S36) pulling the curvature of the plurality of liquid microlenses to a desirable angle with an external electric field; and
(S37) curing the plurality of liquid microlenses with UV light to form a plurality of microlenses.

Figure 4:
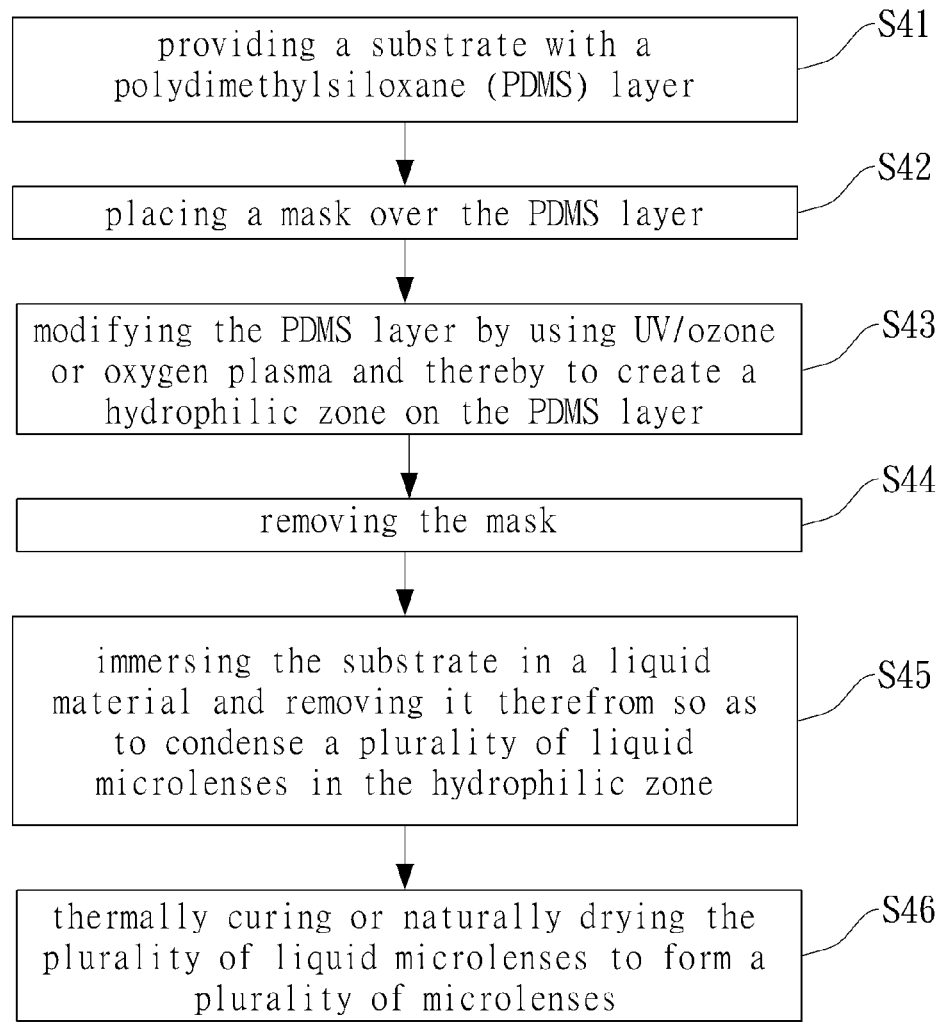
FIG. 4 is a flow chart illustrating a fabrication method of an MLA in accordance with another embodiment of the present invention.

FIG. 4 is a flow chart illustrating a fabrication method of an MLA in accordance with another embodiment of the present invention. This method comprises the following steps:

(S41) providing a substrate with a polydimethylsiloxane (PDMS) layer;
(S42) placing a mask over the PDMS layer;
(S43) modifying the PDMS layer by using UV/ozone or oxygen plasma and thereby to create a hydrophilic zone on the PDMS layer;
(S44) removing the mask;
(S45) immersing the substrate in a liquid material and removing it therefrom so as to condense a plurality of liquid microlenses in the hydrophilic zone; and
(S46) thermally curing or naturally drying the plurality of liquid microlenses to form a plurality of microlenses.

In this method, the liquid material is a mixture of SYLGARD 184A, SYLGARD 184B and Dow Corning Fluid 200.

In this embodiment, the steps concerning the fabrication of MLAs, the fabricated MLAs and implementation are the same as those described above, and thus will not be described again, and only steps distinct from those of the aforementioned embodiment are described.

It is worth mentioning that a person having ordinary knowledge in the art will understand that both the SU(8) photoresist base layer and the PDMS layer are interface hydrophilic modified polymer layers, that the liquid material used in the aforementioned embodiments can be a diluted photoresist liquid material or a diluted PDMS material, and that a person having ordinary knowledge in the art can use any other light, gas or liquid with the property of converting the polymer's hydrophilicity to substitute for UV/ozone and oxygen plasma for the modifying treatment. The modes disclosed in the embodiments are exemplary and are not intended to limit the scope of the present invention, thus a person having ordinary knowledge in the art can readily use other materials to substitute for relevant materials described above.

To sum up, the fabrication method of an MLA and an MLA fabricated using the same of the present invention provide a rapid, low-cost and no etch-transfer process. The entire process is performed at room temperature to prevent thermal residual stress and material issues. In addition, the radius of curvature of the microlens can be controlled by the design of the opening of the mask, the UV/ozone treatment time and the external electric field.

While the present invention has been described by way of preferred embodiments, it is to be understood that the present invention is not limited hereto. A person skilled in the art can make any alteration and modification herein without departing from the spirit and scope of the present invention. The scope of protection of the present invention is defined by the appended claims.

What is claimed is:

1. A fabrication method of a mircolens array (MLA) comprising:
providing a substrate with an interface hydrophilic modified polymer layer;
using any one of light, gas and liquid with the property of converting the polymer's hydrophilicity or any combination thereof to create a hydrophilic zone on the interface hydrophilic modified polymer layer;
coating the substrate with a liquid material so as to condense a plurality of liquid microlenses in the hydrophilic zone;
pulling a curvature of the plurality of liquid microlenses to a desirable angle with an external electric field; and
curing the plurality of liquid microlenses with UV light to form a plurality of microlenses.

2. The fabrication method of an MLA according to claim 1, wherein the step of using light, gas or liquid with the property of converting the polymer's hydrophilicity to create a hydrophilic zone on the interface hydrophilic modified polymer layer further comprises:
using a mask to cause a periodic arrangement of the hydrophilic zone created on the interface hydrophilic modified polymer layer.

3. The fabrication method of an MLA according to claim 1, wherein the step of coating the substrate with the liquid material further comprises:
dipping the substrate in and out of the liquid material at a constant velocity.

4. The fabrication method of an MLA according to claim 1, wherein the liquid material is a diluted photoresist liquid material or a diluted polydimethylsiloxane (PDMS) material.

5. The fabrication method of an MLA according to claim 1, wherein the interface hydrophilic modified polymer layer and the liquid material comprise an SU(8) photoresist material or a PDMS material.

6. The fabrication method of an MLA according to claim 1, wherein the light comprises UV light and the gas comprises ozone or oxygen plasma.

7. The fabrication method of an MLA according to claim 1, wherein the steps are conducted at room temperature.

8. A mircolens array (MLA) suitable for being disposed on a substrate and comprising:
an interface hydrophilic modified polymer layer disposed on the substrate and defining a hydrophilic zone on the substrate via any one of light, gas and liquid with the property of converting the polymer's hydrophilicity or any combination thereof; and
a plurality of mircolenses arranged in the hydrophilic zone; and
wherein a curvature of the plurality of mircolenses are adjusted via an external electric field.

9. The MLA according to claim 8, wherein the hydrophilic zone is in a periodic arrangement.

10. The MLA according to claim 8, wherein the plurality of mircolenses are cured in the hydrophilic zone with UV light.

11. The MLA according to claim 8, wherein the interface hydrophilic modified polymer layer and the plurality of mircolenses comprise an SU(8) photoresist material or a PDMS material.

12. The MLA according to claim 8, wherein the light comprises UV light and the gas comprises ozone or oxygen plasma.

13. A fabrication method of an MLA comprising:
providing a substrate with an interface hydrophilic modified polymer layer;
placing a mask over the interface hydrophilic modified polymer layer;
modifying the interface hydrophilic modified polymer layer by using UV/ozone and thereby to create a hydrophilic zone on the interface hydrophilic modified polymer layer;
removing the mask;
immersing the substrate in a liquid material and removing it therefrom so as to condense a plurality of liquid microlenses;
wherein a curvature of the plurality of mircolenses are adjusted via an external electric field; and
curing the plurality of liquid microlenses with UV light to form a plurality of microlenses.

14. The fabrication method of an MLA according to claim 13, wherein the hydrophilic zone created on the interface hydrophilic modified polymer layer is in a periodic arrangement.

15. The fabrication method of an MLA according to claim 13, wherein the substrate is dipped in and out of the liquid material at a constant velocity.

16. The fabrication method of an MLA according to claim 13, wherein the liquid material is a diluted photoresist liquid material or a diluted PDMS material.

17. The fabrication method of an MLA according to claim 13, wherein the interface hydrophilic modified polymer layer and the liquid material comprise an SU(8) photoresist material or a PDMS material.

18. The fabrication method of an MLA according to claim 13, wherein the steps are conducted at room temperature.

* * * * *